Figure 1:
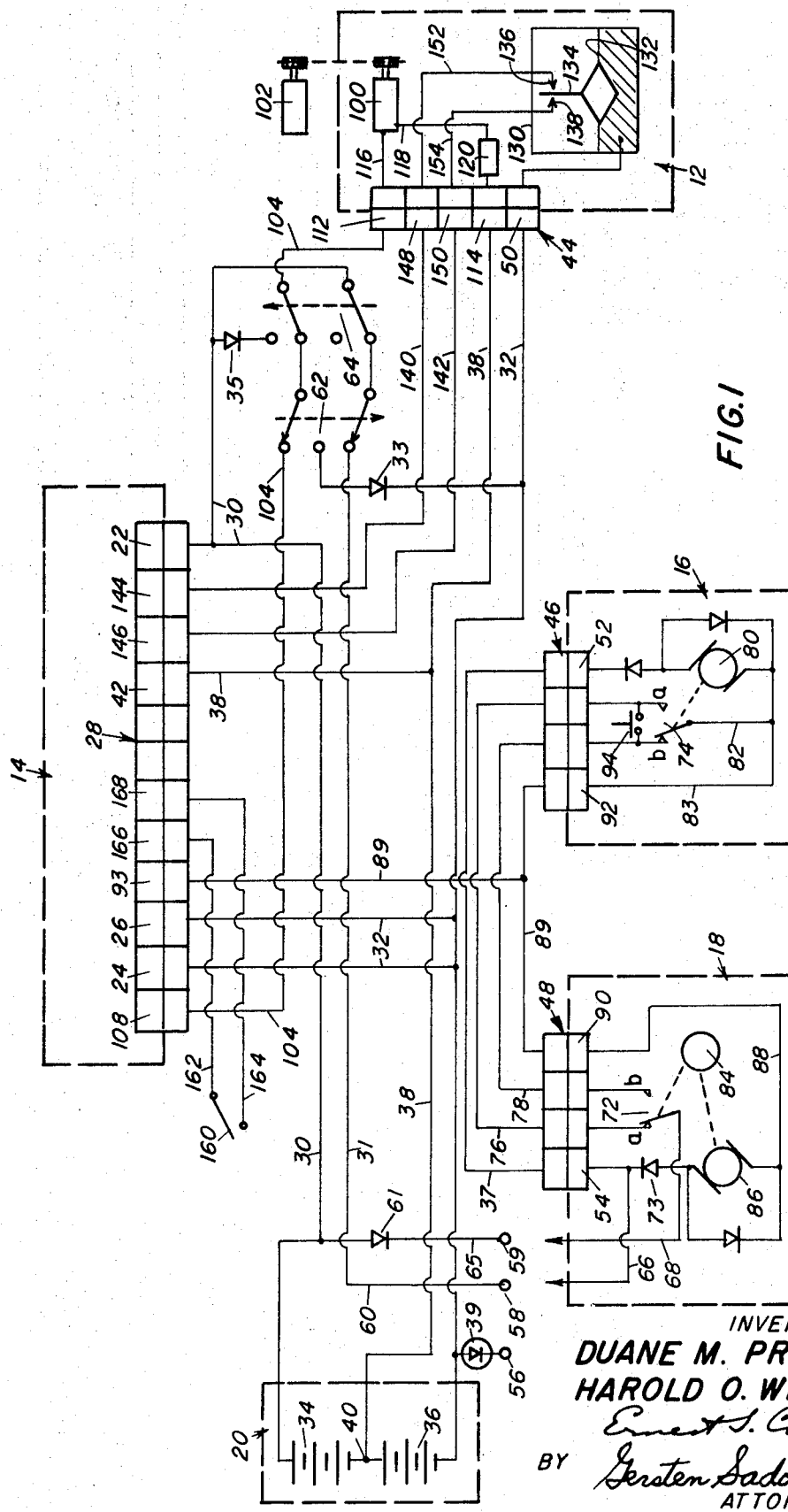

United States Patent

[11] 3,571,682

[72] Inventors Duane M. Preble
Worthington;
Harold O. Wires, Columbus, Ohio
[21] Appl. No. 820,177
[22] Filed Apr. 29, 1969
[45] Patented Mar. 23, 1971
[73] Assignee The United States of America as represented by the Secretary of the Interior

[54] SERVOCONTROL WITH TIME DELAY AND RAMP MOTOR START
7 Claims, 2 Drawing Figs.
[52] U.S. Cl. .................................................. 318/257, 318/681
[51] Int. Cl. ..................................................... G05f 1/08
[50] Field of Search .......................................... 318/20.835, 257, 327, 20.430, 20.810, 20.840

[56] References Cited
UNITED STATES PATENTS
3,293,522  12/1966  Lewis ............................ 318/257X
3,376,486  4/1968  Caputo ........................... 318/257
3,453,523  7/1969  Fair et al. ....................... 318/448X Primary Examiner—Benjamin Dobeck
Attorneys—Ernest S. Cohen and Gersten Sadowsky ABSTRACT: Motor control circuitry imparting time delay and ramp start characteristics to the bidirectional operation of a servomotor. Ramp start is determined by a constant current generated in a transistor circuit charging a capacitor. A further transistor in a circuit responsive to development of the ramp voltage sensed at its base-emitter junction directs growth of a motor voltage control signal to follow ramp form towards a maximum value. A motor energizing voltage feedback received in the emitter-collector circuit of the further transistor opposes the base-emitter junction voltage and effects a dampening of the motor control voltage buildup until consequent lessening of the motor control voltage lessens motor energizing voltage with the result that the further transistor acts to further develop the motor control voltage whereby the effect of the feedback loop thus made operative is progressively diminished as motor energizing voltage is permitted to follow a ramp form to its normal operational value.

INVENTORS
DUANE M. PREBLE
HAROLD O. WIRES
Ernest S. Cohen
BY Gersten Sadowsky
ATTORNEYS

INVENTORS
DUANE M. PREBLE
HAROLD O. WIRES

BY Ernest P. Cohen
Gersten Sadowsky
ATTORNEYS

SERVOCONTROL WITH TIME DELAY AND RAMP MOTOR START

The invention relates to an improved control circuit for a motor, and has particular utility as means adapted to direct the motor operation of an automatic manometer apparatus for indicating and recording data respecting fluid level variations. Comprising this sort of manometer apparatus is a gas filled manometer sensor device which when placed in the fluid responds to fluid level changes by correspondingly varying gas pressure in the manometer. The motor drive vertically positions a housing which constitutes a coupling between the gas manometer and a mercury manometer structure, and in seeking to balance the pressures therein serves to regulate the transmission of sensed data representations to a further housing connected at a remote end of the mercury manometer structure. A float actuated switching mechanism in the further housing responds to mercury fluctuations following fluid level variations by shifting so as to complete a circuit through a singular contact on a rod affixed to the float and one or another of the stationary contacts in the housing. The circuit thus selectively completed by the contacts becomes effective to activate a motor control circuitry whereby a motor is made operable to apply a predetermined directional drive positioning the coupling housing of the manometer systems. Thus the motor drive acts to effect a balance of the pressures in the manometer systems, and operation of indicating and recording mechanisms in accordance with the motor drive displacement. A detailed disclosure of an apparatus like that summarily described herein is available in U.S. Pat. No. 2,942,466, granted on Jun. 28, 1960 to E. G. Barron and H. O. Wires, a coinventor of the present invention.

A unique combination of circuits constituting the present invention provides motor control facilities enabling improved servo followup operations in a manometer sensing fluid level and directing an indicating and recording apparatus in the manner previously disclosed. It is well understood that efforts to gain greater sensitivity, or preciseness in indicating or recording the variability of bidirectional phenomena occurring about null points of a servo drive by stepping up the speed of the drive, ultimately leads to erratic readings at such null points due to directional overreacting or hunting about such points. In the present invention a predetermined time delay which anticipates the start of motor operation, and a subsequent motor start characterized by a ramp current allows the use of a higher speed motor, and enables a higher manometer following rate while still maintaining operational stability when approaching a narrow null setting. A first requisite delay is achieved by charging a capacitor from a fixed voltage determined by a Zener diode. The ramp motor start is achieved by first applying a ramp form of voltage to energize the motor. Ramp motor voltage is obtained by charging a capacitor with a constant current and comparing the effect of its rising potential against the feedback potential of motor operation to determine a difference voltage for application to control motor speed such that applied motor voltage follows the capacitor voltage regardless of motor load. Additionally, short circuit protection for the control circuitry is provided by a disabling circuit made effective in response to simultaneous directional control signals from the liquid level detector. Further, high gain, low leakage silicon transistors of a solid-state circuitry comprising the pertinent structure of the inventive combination permits operation at high efficiency with reduced contact current at the hard contacts of the float switch, which in turn reduces the sort of arcing and oxidation of the contacts normally accompanying the operation of the relay coils heretofore used in this sort of detecting apparatus.

It is an object of the present invention to provide indicating and recording equipment of condition sensing and detecting apparatus driven by a servomotor mechanism with a motor circuit control arrangement for preventing the erratic operation of the equipment which would give unreliable recordings and indications in response to sensing of extended, alternately variable directional conditions.

It is a further object of this invention to provide in a bidirectional motor drive control circuitry a modulated feedback motor start control circuit.

Figure 2:
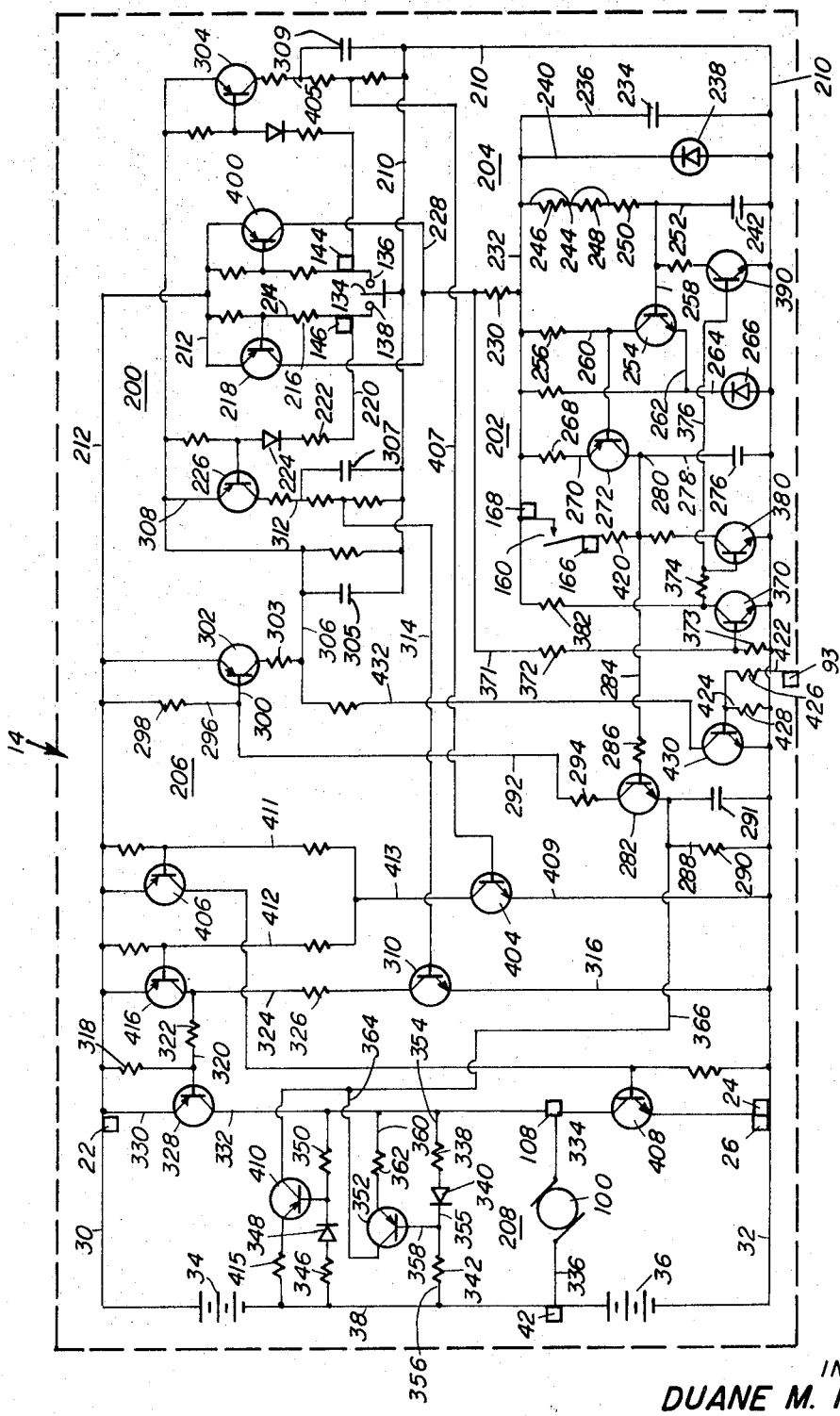

The invention will be further explained and other objects thereof will become apparent with reference to an embodiment of the invention illustrated by way of example in the showing of the accompanying drawing, wherein:

FIG. 1 is a generally schematic diagram of input and output components adapted to coact with a servomotor control circuitry according to the present invention which is represented in the FIG. as a block connected by the circuits operationally associating it with the aforesaid components; and FIG. 2 is a wiring diagram showing the principal details of the servomotor control circuitry of FIg. 1.

Referring to FIG. 1, an automatic indicating and recording apparatus, according to the present invention, appears as an arrangement of separable modules, each represented by a circuit within a dashline box, which are interrelated for operation by wire bundles or cables terminating in mated pin and socket electrical connections at the modules. Illustrated thereby are a servo-controlled liquid level sensing manometer 12, a motor control circuitry 14, an automatic punch-recorder 16, a motor operated timer 18, and a DC power source 20. Pin and socket connections 22, and 24 and 26, all of a cable plug 28, establish current paths to circuits in control circuitry 14, to be hereinafter more fully explained, by way of leads 30 and 32 having their origin at the positive and negative terminals of batteries 34 and 36, respectively, constituting source 20. A further lead 38, starting at the positive-negative junction 40 between the batteries, provides a common return through an electrical connection 42 of plug 28. Manometer 12, recorder 16, and timer 18, are similarly equipped with cable plugs 44, 46, and 48, respectively, wherein the respective electrical connections 50 and 52 and 54, made by leads 32 and 37, provide a path to battery negative from these modules. A socket 56 connected to negative lead 32 by way of a Zener diode 39, and a socket 58 connected to a lead 60, which can be traced to positive lead 30 by way of manually operable double-throw double-pole switches 62 and 64, constitute power supply terminals for timer 18. Separate leads 66 and 68, having plug ends adapted to engage the aforesaid terminal sockets, are joined to a lead from negative connection 54 of recorder plug 48, and a double-throw single-pole switch 72, respectively. A similar switch 74 in recorder 16, and the timer switch 72 have their opposite contact terminals joined by leads 76 and 78 extending between plugs 46 and 48 of these modules.

Recorder 16 includes a punch motor 80 connected in a circuit comprising a connection to negative by way of leads 66 and 37 to plug connection 52, and a lead 82 to the contact arm of switch 74. Timer 28 comprises a clock 84 and a wind motor 86, for this clock. A lead 88 from a terminal of clock motor 86 is traceable on lead 89 to the contact arm of recorder switch 74 by way of plug connections 90 and 92 of the timer and recorder modules, respectively. Lead 89 is also traceable to plug connection 93 whereat this lead enters control circuitry 14. Direct current motors 80 and 86 are protected by diodes across their terminals, and in the energizing leads thereto, in a conventional manner. Zener diode 39 in the negative lead to socket 56 serves to reduce the battery voltage to a fixed amount which satisfies the power requirement of motors 80 and 86. The separate positive switch leads to the respective contacts of recorder switch 74 are connected to a normally open pushbutton switch 94. As indicated by dash lines in FIG. 1, the respective contact arms of switches 72 and 74 are actuated by cams or the like driven by clock 84 and motor 80, respectively. A third socket 59, connected to positive battery by a lead 65 and lead 30, is provided for a connection to auxiliary equipment, such as a binary digital transmitter. Socket 56 is adaptable to serve as a common negative connection to circuits extending from sockets 59 and 58. Accidental reverse connection to equipment connected by socket 59 is avoided by a blocking diode 61. The clock cam turns with time whereby it positions switch 72 to alternately reside on its normally closed contact 72a and then its normally open contact 72b. With recorder switch 74 residing on switch contact 72a, motor 80 is energized in a circuit completed through the switches and including leads 68, 76, 82, 37 and 66. Motor 80 runs until stopped when the cam it positions moves motor switch 74 to an opposing contact. Recorder 16 therefore has two phases per cycle which are preset punch and punch cut. In the following cycle motor 80 is energized through contacts 72b and 74b in the circuit including leads 68, 78, 82, 37 and 66, until the motor contact is returned to contact 74a. Clock motor 86, which is energized along with motor 80 in a circuit including leads 68, 76 or 78, 82, 83, 89, 88 and 66, functions to wind the automatic clock spring. Pushbutton 94 is a manual control causing recorder 16 to cycle, as was previously explained, and thereby to punch cut.

Manometer 12 includes a motor 100 wherefrom is obtained the drive which when displacing a housing containing mercury under pressure to effect balancing of the manometer, as previously explained, also drives an indicator 102, and directs the data input operation of recorder 16. Energization of motor 100 is accomplished by way of circuits made operational in motor control circuitry 14, and the circuitry connecting the latter to the motor. These connections include leads 104 and 38 extending between plug 28 connections 108 and 42, and plug 44 connections 112 and 114, from whence the circuit is completed to the motor by leads 116 and 118. Connections by lead 118 place in the motor circuit a normally closed limit switch 120 adapted to be actuated for disabling the motor circuit by the aforesaid manometer balancing housing upon displacement thereof to either end of its travel span. A further module 130, shown in FIG. 1 as within manometer module 12, constitutes a further housing fixed in the apparatus and communicating with the balancing housing through a column of mercury seeking its level 132 in module 130. A rod contact 134, carried by a float riding on mercury level 132, is adjusted by changes in the level whereby the contact is brought into engagement with either of two vertically separated fixed contacts 136 and 138, depending on whether a rising or lowering liquid level is sensed by the manometer input parts. Operational inputs derived at contacts 136 and 138 are supplied to control circuitry 14 by way of leads 140 and 142 which extend between the control circuitry plug connections 144 and 146, and manometer plug connections 148 and 150. Further leads 152 and 154 join contacts 136 and 138 to the aforesaid control circuitry connections in manometer plug 44. A time delay on-off switch 160 provided to set operational characteristics of control circuitry 14, as will be hereinafter more fully explained, is connected by way of leads 162 and 164 entering the control circuitry through plug connections 166 and 168, respectively.

In essence, motor control circuitry 14 functions to avoid as a response to an occurrence in module 130 of the engagement of float contact 134, with either fixed contact 136 or 138, an immediate drive by balancing motor 100 for displacing the previously mentioned balancing housing. Such an immediate displacement of the balancing housing towards a null position following a reversal of its travel direction would normally result in this housing overtraveling its mark to give rise to a further unbalance in the opposite sense since the float positioning contact 134 does not instantly follow the balancing housing as the latter starts to move in a corrective direction. The resulting hunting about a null point leads to the recording of imprecise data. Control circuitry 14 acts to initially delay for a predetermined short time the start of motor operation upon contact engagement in module 130, and thereafter permits a progressive startup of motor drive in an appropriate direction. As a result, constantly reoccurring small variations in the liquid level being measured would not be recorded as a ragged "level versus time" curve, but instead there would be produced a relatively smooth curve more closely indicative of the actual variations in the liquid level. On the other hand, any steady unidirectional change in liquid level would be recorded accurately and without interruption since in that case motor startup as indicated above would be followed by motor operation at a predetermined maximum speed.

Reference is now made to FIG. 2 disclosing details of motor control circuitry 14, including the previously identified electrical connections in plug 28 which are denoted by reference numerals heretofore applied to these connections in FIG. 1. These plug connections appear in the leads of the larger assemblies of circuitry 14 which are broadly designated by reference to their primary functions. Thus, circuitry 14 is seen to comprise a switching section 200 which responds to the disposition of float contact 134 with respect to fixed contacts 136 and 138 to determine an operational signal input for a ramp section 202 where the effectiveness of such input is initially subjected to a delay by a delay section 204. Signals in ramp section 202 rise to an effective strength at a substantially linear rate prior to triggering an output signal from an amplifier section 206. In turn, the amplifier section determines an operational control input to a predetermined one of directionally characterized circuits of a section 208 in which the energization of balancing motor 100 is regulated. However, the motor speed buildup in section 208 is caused to follow the slope of a ramp effect by means of a servo feedback loop between the motor energizing section and the output end of ramp section 202.

In the absence of any change in the liquid level being measured float contact 134 takes a position centered between fixed contacts 136 and 138, and none of a plurality of transistors comprising circuit 14, pass current. When a lowering liquid level brings float contact 134 into engagement with fixed contact 138, a signal circuit is completed between negative lead 210 and positive lead 212 by way of the engaged contacts, lead 214 and a coupling resistor 216 therein, and the base-emitter junction of a PNP transistor 218. In addition a signal circuit is primed by way of lead 220, coupling resistor 222, diode 224, and the base of a PNP transistor 226. The consequent conduction by transistor 218 gives rise to a signal input to ramp section 202 and delay section 204 by way of the emitter-collector of transistor 218, lead 228, resistor 230, and a lead 232 establishing connections to one end of a plurality of parallel circuits which are completed by connections to negative lead 210. A capacitor 234 of delay section 204 is thereby caused to charge in one of the parallel circuits comprising a lead 236. Resistor 230 in the input circuit functions to reduce the possible supply voltage to a constant load value below the maximum battery voltage available. A Zener diode 238, connected by way of leads 232 and 240, in a further circuit in parallel with the circuit of capacitor 234, permits the capacitor to charge until the Zener operating voltage of diode 238 is reached and then held across these circuits until the capacitor is discharged. Together with the charging of capacitor 234 there occurs a charging of a capacitor 242 in another parallel circuit traceable from lead 232 to lead 244, having serially connected therein resistors 246, 248, and 250, and lead 252 to negative at lead 210. Capacitor 242 is forced to charge toward the Zener voltage of Zener diode 238. When the voltage on capacitor 242 reaches a voltage determined by a further Zener 266 and the base-emitter junction of an NPN transistor 254, in a circuit from positive through leads 244, 258, 262, 264 and negative lead 210, the capacitor charging current is diverted to the base of transistor 254 causing it to conduct. No further circuit action can take place until transistor 254 is thus placed in a conducting state. A lesser time for this operational time delay is settable by shunting resistors 246 and 248 with jumpers such that only a lower rated resistor 250 remains effective, and the longer delay times are thereafter achieved by removing one or both of the jumpers.

Consequently, operational delay determined by the charging of capacitor 242 terminates when voltage at the base-emitter junction of transistor 254 becomes sufficient to turn the transistor on to pass current in a ramp section circuit which is completed by way of lead 232, resistor 256, lead 260, the collector-emitter of transistor 254, leads 262, 264, Zener diode 266, and to negative lead 210. The operation now started completes an additional circuit which is traceable from leads 232, through a resistor 268, lead 270, the base-emitter junction of a PNP transistor 272, lead 274, the collector-emitter of transistor 254, and leads 262, 264, diode 266, and negative lead 210. Since the aforesaid additional circuit serially connecting the base-emitter of transistor 272, emitter resistor 268 and diode 266, is in a parallel connection with Zener diode 238, there is impressed across the base-emitter junction of transistor 272 and resistor 268 a voltage equal to the aforesaid operating voltage of diode 238 minus the operating voltage of diode 266. This voltage at transistor 272 allows base current thereof to flow whereby transistor 272 turns on when transistor 254 turns on. Resistor 268 limits the current through transistor 272 to a value set by the voltage across the resistor. After allowing for a small voltage drop across the base-emitter junction of transistor 272, a voltage is determined which forces a constant current to pass through the transistor emitter-collector. It is known that a constant current charging a capacitor will generate a ramp voltage form with a slope directly proportional to the charging current and inversely proportional to capacitance. Therefore, a capacitor 276, serially connected to the collector of transistor 272 by way of lead 278 and negative lead 210, is charged with a voltage characterized as a ramp having a slope directly proportional to the charging current, and inversely proportional to the capacitance.

The ramp voltage as presented at a junction 280 between transistor 272 and capacitor 276, is applied to the base-emitter junction of an NPN transistor 282 by way of a circuit completed by a lead 284 having a coupling resistor 286 therein, a lead 288 and a resistor 290 therein, and negative lead 210. However, transistor 282 becomes effective to pass current only after the charge on capacitor 276 reaches a small part of its maximum value, giving rise to a short fixed delay which adds to the selective delays previously described. With the passage of current through transistor 282 there is activated a circuit which extends from negative lead 210, through lead 288 and resistor 290 therein, the collector-emitter of transistor 282, a lead 292 including a resistor 294 therein, and completed to positive lead 212 by way of parallel connections including in one line a lead 296 and a resistor 298 therein, and in another line a lead 300, and the base-emitter junction of a PNP transistor 302. Since a sufficient bias is thus applied to transistor 302, it is switched on for operation in amplifier section 206.

Depending on which one of the fixed contacts 136 and 138 is in engagement with float contact 134, transistor 302 is effective to pass current either through transistor 226, or through a PNP transistor 304 which are operative in symmetrical circuits of switching section 200. Where as in the present example contact 138 is engaged with contact 134, and transistor 218 is caused to conduct, transistor 226 is switched on by reason of the potential applied to its base by way of lead 220, as was previously described, and the circuit from positive lead 212 to the emitter of transistor 226 completed by way of the emitter-collector of transistor 302, resistor 303, and leads 306 and 308. Transistor 226 is thus effective to steer positive current from lead 212 to the base of an NPN transistor 310, by way of a circuit including the emitter-collector of transistor 302, resistor 303, leads 306 and 308, the emitter-collector of transistor 226, a lead 312 and the resistors therein, a lead 314, the base-emitter junction of transistor 310, and a lead 316 to negative lead 210. Therefore transistor 310 conducts in a circuit extending from positive lead 212, through a resistor 318, a lead 320 and a resistor 322 therein, a lead 324 and a resistor 326 therein, a completed to negative on lead 316. A PNP power transistor 328 is thus also caused to conduct upon receipt of a positive potential at its base from the voltage divider constituted by resistors 318 and 322 connected to this base. Power from source 34 is thereby made available as a supply for motor 100 in a circuit completed through transistor 328 by way of positive lead 30, a lead 330 from plug connection 22, further leads 332, 334, 336 and by way of plug connection 42 to lead 38 which provides a connection to the negative terminal of source 34. Operational stability of transistors 302, 226 and 304, is assisted by providing the circuits of the respective transistors with stabilizing components including capacitors 305, 307, and 309, respectively associated with serially connected resistors in a conventional manner.

The voltage across motor 100 in the course of rising to its source value is also impressed on resistor-diode combinations including in a first circuit resistor 338, diode 340, resistor 342, and in a second circuit resistor 346, diode 348, and resistor 350, connected in parallel with the motor. Therefore, as power transistor 328 is turning on, the aforesaid combination of resistor 338, diode 340, resistor 342, which is associated with a PNP transistor 352, will conduct current in a circuit completed from a positive connection at lead 332 to a negative connection at 38 by way of the combination's circuit leads 354 to 356. Since resistors 338 and 342 are of the same resistance value they constitute a divider of the source voltage across their circuit whereby a positive potential of one-half the voltage of source 34 is applied on a lead 358 to the base of transistor 352. Since diode 340 initially tends to cancel out a requisite base to emitter voltage for activating transistor 352, which is preferably a silicon transistor, transistor 352 does not switch on immediately. However when motor voltage has increased from zero to about 10 percent of its full operating voltage or that percentage of source 34, sufficient bias is present at the base of transistor 352 to turn on this transistor.

The activation of transistor 352 completes a circuit traceable through positive lead 330, emitter-collector of transistor 328, lead 332, a lead 260, a resistor 362, the emitter-collector junction of transistor 352, further circuit leads 364 and 366, lead 288, resistor 290 and negative lead 210. The circuit thus completed through transistor 352 constitutes a feedback circuit wherein the current flowing is proportional to one-half the applied motor voltage. The derivation of current for passage through transistor 352 is thus controlled to follow the generation of a ramp voltage at the collector of transistor 272 and present at junction 280, as will be hereinafter more fully explained. In this connection resistor 362, which is used to determine the current in the feedback circuit, and resistor 290 have the same value. Further, resistor is in a circuit completed through the emitter-collector junction of transistor 282 by way of positive lead 212, resistor 298, lead 296 and 292, resistance 294, lead 288 and negative lead 210. Consequently, since current affecting resistors 362 and 290 correspond in value, one-half of the existing motor voltage is level shifted to the emitter terminal of transistor 282. Therefore, as the voltage at the emitter of transistor 282 begins to approach the voltage present at the base of transistor 282 due to the voltage at ramp section junction 280, this transistor will begin to turn off with the immediate result that the voltage supplied to motor 100 will become lower due to the control of the conductive condition of transistor 282 exercised over the generation of motor voltage as was previously explained in connection with amplifier section 206. The subsequent lowering of the feedback voltage acts to diminish the positive voltage at the emitter of transistor 282 such that this transistor again conducts above cutoff whereby the motor voltage steps up until the voltage level at the emitter of the transistor again approaches that at the base of the transistor. The motor voltage is thereby forced to follow the ramp voltage generated in the circuit comprising transistor 272 and capacitor 276 since the voltage at the base of transistor 282 is determined by the voltage condition at junction 280 due to the state of the ramp, as was previously explained. It therefore can be seen that a feedback loop is operable wherein as the ramp increases so does the motor voltage feedback at which transistor 282 will start to cutoff. At the end of a predetermined time the motor voltage will closely approach the motor supply voltage whereby full motor drive is applied to balance the apparatus and set the input data in recorder 16. At that time the drive control and power transistors 310 and 328 are saturated. A relatively large capacitor 291, connected in the feedback circuit through lead 292, is provided to momentarily delay the application of a feedback effect upon the control of the motor energization circuit in order to insure that initial voltage in this circuit remains adequate for a time required to start up motor 100. In general, however, capacitor 291 is desirable for its stabilizing effect upon the operation of the circuits obtaining the feedback control.

In the event float contact 134 engages fixed contact a it is a PNP transistor 400 which turns on and prepares the input circuits for the ramp and delay sections. This operation occurs in the same manner as that previously described in connection with the operation of transistor 218, since the corresponding circuits are symmetrical in all respects. Transistors 254, 272, 282, and 302 function in their circuits in the same manner as that previously described for them. However, since transistor 400 is activated in this instance, a directional control of motor operation is initiated with the activation of transistor 304. Accordingly, an NPN transistor 404 is turned on in a circuit completed through leads 405, 407, and 409, and upon conducting in a circuit including leads 411, 413, and 409, this transistor effects the conduction of a PNP transistor 406. Since transistor 406 functions as an inverter it supplies a proper bias to cause an NPN power transistor 408 to conduct in an energization circuit for motor 100 comprising source 36 which provides negative and positive connections to the motor on leads 334 and 336, respectively. Motor 100 is therefore driven in a direction opposite to that produced when PNP transistor 328 is conducting and source 34 in its circuit provides positive and negative connections to motor leads 334 and 336, respectively. A PNP transistor 410 turns on in response to a voltage determined by resistor 346, diode 348, and resistor 350, in a circuit energized by the conduction of transistor 408, and gives rise to the feedback voltage on lead 366. A resistor 415 in the emitter circuit of transistor 410 functions to determine the current in the feedback circuit in the same way as resistor 362 functions in the feedback circuit when it is activated through transistor 352. Therefore, resistor 415 corresponds in value to resistor 290 wherefore the current flowing in the feedback circuit completed through transistor 410 is proportional to one-half the applied motor voltage, and the ramp controlled feedback loop function thereafter occurs in the same manner as that previously described in connection with the operation of transistor 352.

Circuits provided to reset time delay section 202, and delay section 204, include three NPN transistors 370, 380 and 390. Energization of the apparatus turns on reset transistor 370 by a current at its base-emitter junction in a circuit which is completed from positive lead 212 by the emitter-collector junction of switching transistors 218 or 400, and a lead 371 extending to negative 210 by way of resistors 372 and 373. When transistor 370 is passing current the base-emitter junctions of transistors 380 and 390 are shorted through connections to a circuit including lead 376 and a resistor 374, and are thus held in a nonconducting state. Therefore, capacitors 276 and 242 which are connected across the collector-emitter junctions of transistors 380 and 390, respectively, are free to charge. However, when the apparatus is deenergized, and transistor 370 is consequently turned off, reset transistors 380 and 390 are momentarily turned on by the residual charge in capacitor 234 by way of a circuit through leads 376, 168, 236, and 210, and resistors 382 and 374. This momentary conduction of transistors 380 and 390 cause capacitors 276 and 242 to discharge whereby the ramp and time delay circuits are reset.

In the event contacts 136 and 138 are short circuited so as to cause the activation of both switching transistors 218 and 400, then transistors 226 and 304 both pass current whereby transistors 310 and 404 are turned on. However, it can be seen from FIG. 2 that the activation of transistor 404 prepares two circuits, on leads 412 and 411, to carry current for biasing a PNP transistor 416 as well as transistor 406. When transistor 416 turns on it shunts the base-emitter junction of transistor 328 which forces the transistor off even though transistor 310 may be on.

The time delay and ramp effect may be circumvented by closing the delay off switch 160 appearing in FIGS. 1 and 2. With this switch closed and engagement of one of the control contacts 136 and 138, capacitor 276 is very quickly charged to a high voltage, or close to a battery potential, in the circuit traceable from lead 232 by way of switch 160, resistor 420 leads 284, and 278 to negative lead 210. As hereinbefore explained, this condition turns on transistors 282 and 302. Power to run motor 100 in one or the other direction is applied by either transistor 328 or 408 in accordance with whether transistor 226 or 304 has been primed by reason of the control contact engagement. The feedback circuit established by either transistor 352 or 410 still attempts to follow the high voltage on the base of difference detector transistor 282, but the feedback circuit can only generate the highest feedback voltage at the emitter of transistor 282 so that the full supply voltage is nearly immediately applied to the motor. Thus all effective delay and ramp start have been eliminated.

Provision is also made in the apparatus disclosed herein to automatically disable the control circuitry upon the application thereto of an external motor stop signal. A relatively high positive signal, with respect to circuit negative lead 210, is placed at circuit connection 93 of plug 28 wherefrom this signal is received in a circuit to negative battery comprising leads 422, 424, wherein are connected resistors 426 and 428, respectively, constituting a voltage divider placing a positive potential at the base of an NPN transistor 430 connected thereto. In this manner transistor 430 is caused to conduct whereby it shunts through its collector-emitter all current to negative lead 210 that may or may not be emanating to lead 432 from the collector of transistor 302. This result effectively turns off transistors 226, 304, 310, 404, 406, 416, 328 and 408, such that no motor action can occur when transistor 430 is in a conductive state. In normal operation this cooperation constitutes an interlock to prevent operation of motor 100 whenever recorder 16 is recording. For this purpose lead 89 extends to plug connection 93, as shown in FIG. 1, from the common connection therefrom to the motor circuits of recorder 16 and timer 18. When recorder 16 is operating its punch motor 80 must be running such that a positive motor voltage is applied to plug connection 93. A further interlock provided is operable in conjunction with manual operation pushbuttons, which are hereafter described.

By referring again to FIG. 1, the manual operation pushbuttons 62 and 64, which are found in the energizing circuit connections to the several motors of the apparatus, appear as double-pole, double-throw pushbuttons. Leads 30, 31, constituting the connection to battery positive that powers recording motor 80, are routed through the back contacts of one set of contacts on both switches so that whenever either button is pushed recording motor 80 is prevented from running. When button 62 is pushed motor 80 is disconnected from the plug 28 electrical connection 108 in the power circuit for motor 100, and connected to negative through a diode 33. When button 64 is pushed balance motor power lead 104 is disconnected from button 62 and connected to the positive lead 30 through diode 35. If both buttons 62 and 64 happened to be depressed balance motor 100 will only run in the direction indicated by button 64. However, time clock drive motor 86 continues to be energized by power connections through positive lead 68, time-controlled switch 72 leads 76 or 78, punch motor switch 74, leads 82, 83, 89, 88, and a connection to negative battery lead 66 by way of diode 73.

While a preferred form of the present invention has been illustrated and described herein it is understood that the invention is not limited thereby, but is susceptible to change in form and detail.

We claim:
1. In an automatic data recording and indicating apparatus served by a DC source, and employing a motor driving a recorder and activating a servo drive for a positional sensing mechanism having operational therein a displaceable device detecting bidirectional conditions and producing signals in accordance therewith, wherein the improvement comprises for directing the operation of said motor a control circuitry including in combination a settable switching circuit responsive to a direction representing signal from said device to prepare for completion therein of a predetermined circuit path corresponding to said directional signal, and produce a signal output which triggers the operation of delay and ramp circuits of said control circuitry, said triggered circuits producing after a predetermined delay a ramp signal which determines a signal input to an operational governing circuit for said servo drive, a first circuit responsive to an output signal of said governing circuit operating to gate a further signal through said prepared path of said switching circuit and into a second circuit responsive thereto to gate trigger signals to a third circuit responsive thereto for gating energizing potential from said DC source into a control circuit for driving said motor in a direction which compensates for said direction represented by said signal from said device, further circuits selectively energized in accordance with said motor energization potential which supply signals to said servo drive operational governing circuit wherein said supplied signals are compared with said ramp signal input thereto to determine a servo action on said motor drive which follows the operational control characteristic of said governing circuit output by way of said first, second and third gating circuits and motor drive control circuit whereby the increasing magnitude of said ramp signal progressively functions to diminish to nothing said servo action so as to accomplish a responding regulation of direction and magnitude for said motor energization potential.

2. A motor control circuitry having operationally interrelated circuits comprising, in combination with a voltage source, a first circuit for energizing a motor connected therein with a measure of said source voltage developing in accordance with the operational condition of said motor, a second circuit controlling the application of effective source voltage in said first circuit for energizing said motor from a start to a normal operational speed, a third circuit developing a ramp voltage reaching a maximum value in a time predetermined by a delay circuit thereof, and a fourth circuit including means detecting said voltages developing in said first and third circuits and comparing said detected voltages to derive for input to said second circuit an operational voltage therefore, whereby control of said first circuit by said second circuit follows the relative magnitudes of said compared voltages through a feedback loop wherein the energizing voltage of said first circuit is directed toward normal operational speed for said motor thereof during said predetermined time.

3. In the motor control circuitry of claim 1, said settable switching circuit comprising a symmetrical arrangement of a pair of component circuits wherein each said component circuit is operatively connected to a respective one of directional condition detectors of said bidirectional condition detecting device, and includes a first transistor responsive to detection of a directional condition corresponding thereto to effect completion of a further circuit common to both said component circuits whereby said DC source is connected across said circuit for producing delay and ramp characteristics in said control output to said operational governing circuit, and a second transistor concurrently responsive to said detection of said corresponding directional signal to assume a bias preparing said circuit path for permitting conduction in said first gating circuit.

4. In an automatic recording and indicating apparatus served by a DC source, and employing a motor driving a recorder and activating a servo drive for a positional data-sensing mechanism having operational therein a device detecting bidirectional conditions, wherein the improvement comprises for said motor a control circuitry including in combination a plurality of operationally interrelated and functionally distinct circuits respectively operating in said control circuitry to switch circuit connections which initiate circuitry operation and prepare circuits directing motor control signals in accordance with directional requirements of said sensing mechanism, introduce delay and ramp characteristics to said motor control signal, amplify said motor control signals determined by the operation of said introducing and switching circuits, and regulate the energization of said motor in accordance with said motor control signals determined by said amplifying and introducing circuits, said circuit for introducing said delay and ramp characteristics to said motor control signals comprising a first component circuit having a capacitor and a Zener diode connected in parallel, a second component circuit in parallel with said first component circuit and having connected in series a resistor, the emitter-base junction of a PNP transistor, the collector-emitter of a NPN transistor and a further Zener diode, and the base of said NPN transistor being connected to sense the charge of said capacitor, a third component circuit in parallel with said first and second component circuits and having serially connected therein said resistor, the emitter-collector of said PNP transistor and a further capacitor, a fourth component circuit having the base-emitter junction of a further NPN transistor connected to sense the charge of said further capacitor through a further resistor, and a fifth component circuit connected across the DC source and having serially connected between negative and positive terminals of said source a still further resistor the emitter-collector of said further NPN transistor and the base-emitter junction a further PNP transistor including a current limiting resistor therebetween, said circuits connected in parallel being adapted to receive a motor control signal from said switching circuit whereby after a delay due to time required for charging said capacitor to the operating voltage of said Zener diode, said NPN transistor conducts and concurrently therewith said PNP transistor conducts at a voltage rising across said emitter-collector thereof and said resistor which corresponds substantially to difference the operating voltages between said Zener diode and said further Zener diode so as to force a steady current through said PNP transistor and charge said further capacitor with a ramp voltage directly proportional to the charging current, and after an additional delay due to the charging to a predetermined voltage of said further capacitor said further NPN transistor conducts and signals said further PNP transistor to conduct in a circuit adapted to activate said circuit for amplifying.

5. In an automatic recording and indicating apparatus served by a DC source, and employing a motor driving a recorder and activating a servo drive for a positional data-sensing mechanism having operational therein a device detecting bidirectional conditions, wherein the improvement comprises for said motor a control circuitry including in combination a plurality of operationally interrelated and functionally distinct circuits respectively operating in said control circuitry to switch circuit connections which initiate circuitry operation and prepare circuits directing motor control signals in accordance with directional requirements of said sensing mechanism, introduce delay and ramp characteristics to said motor control signal, amplify said motor control signals determined by the operation of said introducing and switching circuits, and regulate the energization of said motor in accordance with said motor control signals determined by said amplifying and introducing circuits, said circuit for amplifying motor control signals comprising a PNP transistor having the base-emitter junction thereof in a first component circuit sensing the output of said circuit for introducing said delay and ramp characteristics to said motor control signals, said circuit for switching comprising a symmetrical arrangement of further component circuits wherein each said further component circuits includes a further PNP transistor having the emitter-collector thereof in circuit with the emitter-collector of said PNP transistor and adapted to be prepared to direct motor control signals by selective biasing to conduct exclusively of one another in accordance with one of the opposite directional conditions detected by said device, a second component circuit connecting the emitter-collector of said further PNP transistor of one of said further component circuits to the base-emitter junction of an NPN transistor having the collector-emitter thereof connected to the base-emitter junction of a still further PNP transistor operable to activate one of two opposite unidirectional control connections of said circuit for regulating the energization of said servomotor, a third component circuit connecting the emitter-collector of said further PNP transistor of the other of aid further component circuits to the base-emitter junction of a further NPN transistor, and a further component circuit wherein a potential of the emitter-collector of said further NPN transistor is sensed by means inverting the polarity of said potential, a fifth component circuit including said inverting means and supplying said inverted potential to the base-emitter junction of a still further NPN transistor operable to activate the other of said two unidirectional motor control connections, whereby conduction in said PNP transistor forces conduction in said prepared one of said further component circuits, and activation of one of said two unidirectional motor control circuits in accordance with a conduction produced in one of said second and third component circuits in response to conduction in said prepared circuit of said symmetrical arrangement.

6. The motor control circuitry of claim 5, further comprising a sixth component circuit operable to limit said motor drive to one direction in the event said device is shorted and said further PNP transistors of both further component circuits are biased to conduct in accordance with different directional conditions, said sixth component circuit comprising a yet still further PNP transistor having the base-emitter junction thereof connected to the collector-emitter junction of said further NPN transistor and the emitter-collector thereof connected to the collector-emitter of said NPN transistor and to the base-emitter of said still further PNP transistor, whereby conduction of said further NPN transistor causes conduction of said yet still further PNP transistor to thereby shunt the base-emitter junction of said still further PNP transistor and permit operational potential to rise only in said still further NPN transistor to activate the said other of said two unidirectional motor control connections.

7. In an automatic recording and indicating apparatus served by a DC source, and employing a motor driving a recorder and activating a servo drive for a positional data sensing mechanism having operational therein a device detecting bidirectional conditions, wherein the improvement comprises for said motor a control circuitry including in combination a plurality of operationally interrelated and functionally distinct circuits respectively operating in said control circuitry to switch circuit connections which initiate circuitry operation and prepare circuits directing motor control signals in accordance with directional requirements of said sensing mechanism, introduce delay and ramp characteristics to said motor control signal, amplify said motor control signals determined by the operation of said introducing and switching circuits, and regulate the energization of said motor in accordance with said motor control signals determined by said amplifying and introducing circuits, said circuit for amplifying including first and second component circuits adapted to selectively and nonconcurrently conduct in response to an input therein of a circuit preparation signal produced in said circuit for switching in accordance with the application therein of a directional signal by said device discriminating between different directional signals, and a motor control signal defined by said circuit for introducing delay and ramp characteristics said circuit for introducing having an NPN transistor wherein the base-emitter junction is connected to a circuit junction whereat a predetermined voltage is adapted to be progressively derived following a ramp current, and the collector-emitter of said NPN transistor is in a third component circuit including the base-emitter junction of a PNP transistor adapted when conductive through the emitter-collector thereof to provide said motor control signal to said first or second component circuits as determined by said circuit preparation signal, said circuit for regulating motor energization comprising a fourth component circuit including a further PNP transistor having the base-emitter junction thereof connected to sense conduction in said first component circuit, and the emitter-collector of said further PNP transistor being connected between one terminal of two terminals of said driving motor and a terminal of a predetermined polarity of said source in a circuit completed through said motor terminals and at a source terminal of opposite polarity a still further PNP transistor having the base-emitter junction thereof sensing the voltage condition of a voltage divider circuit connected across said motor terminals and upon sensing a predetermined voltage said still further PNP transistor conducts in a circuit through the emitter-collector thereof and completed through a current limiting resistor, a fifth component circuit including said resistor and the collector-emitter of said NPN transistor, and said circuit for regulating further comprising a sixth component circuit including a further NPN transistor having the base-emitter junction thereof connected to sense conduction in said second component circuit and the collector-emitter thereof connected between said one terminal of said motor and a source terminal of a polarity opposite to said predetermined polarity, a yet still further PNP transistor having the base-emitter junction thereof sensing the voltage condition of a further voltage divider circuit connected across said motor terminals and upon the sensing of a predetermined voltage said yet still further PNP transistor conducts in a seventh component circuit through the emitter-collector thereof and completed in said sixth component circuit through said resistor, such that the conductive state of said PNP transistor is determined by the resultant effective current arising in said NPN transistor from the difference in said voltages applied to said base-emitter junction and said collector-emitter thereof, and whereby a feedback loop is operable through said NPN transistor to determine an increasing motor control voltage following sd progressively derived predetermined voltage during said conductivity of said PNP transistor, thereby giving rise to a voltage progressively increasing to a steady operational value for energizing said motor to drive in a direction predetermined by conductivity in one of said components of said first and second circuits.